(12) United States Patent
Malinovskiy, I et al.

(10) Patent No.: US 9,534,944 B2
(45) Date of Patent: Jan. 3, 2017

(54) METHOD FOR DETERMINING AND/OR MONITORING FILL LEVEL OF A MEDIUM IN A CONTAINER

(71) Applicant: Endress + Hauser GmbH + Co. KG, Maulburg (DE)

(72) Inventors: Alexey Malinovskiy, I, Maulburg (DE); Stefan Gorenflo, Hausen (DE); Dietmar Spanke, Steinen (DE); Edgar Schmitt, Friesenheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 156 days.

(21) Appl. No.: 14/417,878

(22) PCT Filed: Jul. 26, 2013

(86) PCT No.: PCT/EP2013/065776
§ 371 (c)(1),
(2) Date: Jan. 28, 2015

(87) PCT Pub. No.: WO2014/019948
PCT Pub. Date: Feb. 6, 2014

(65) Prior Publication Data
US 2015/0192449 A1    Jul. 9, 2015

(30) Foreign Application Priority Data
Aug. 3, 2012    (DE) .......... 10 2012 107 146

(51) Int. Cl.
*G01S 13/88*    (2006.01)
*G01S 7/292*    (2006.01)
(Continued)

(52) U.S. Cl.
CPC .......... *G01F 23/0076* (2013.01); *G01F 23/28* (2013.01); *G01F 23/284* (2013.01); *G01F 23/296* (2013.01); *G01S 7/292* (2013.01); *G01S 13/88* (2013.01)

(58) Field of Classification Search
CPC ......... G01F 23/284; G01S 13/88; G01S 7/292
(Continued)

(56) References Cited

U.S. PATENT DOCUMENTS 5,614,911 A    3/1997 Otto
5,948,979 A *  9/1999 Fitsch .................. G01F 23/284
                                              73/290 V
(Continued)

FOREIGN PATENT DOCUMENTS

DE        4332071 A1    3/1995
DE   102004055551 A1    5/2006
(Continued)

OTHER PUBLICATIONS

German Search Report, German PTO, Munich, Apr. 10, 2013.
(Continued)

*Primary Examiner* — Peter Bythrow
(74) *Attorney, Agent, or Firm* — Bacon & Thomas, PLLC

(57) ABSTRACT

A method for determining and/or monitoring fill level of a medium in a container with a measuring device, which works according to the travel time measuring method, wherein measurement signals are transmitted toward the medium and are received, wherein from the high-frequency total measurement signal, composed by superimposing the transmitted measurement signals, the reflected wanted echo signals and the disturbance echo signals, a raw echo curve or digitized envelope curve is ascertained. The wanted echo signals and/or the disturbance echo signals in the raw echo curve or the digitized envelope curve are ascertained based on an ideal echo curve, which shows the amplitude of the echo signals of an ideal reflector as a function of the distance (Continued)

from the ideal reflector, and based on the ascertained wanted echo signal the fill level is determined.

13 Claims, 3 Drawing Sheets

(51) Int. Cl.
    *G01F 23/284*     (2006.01)
    *G01F 23/00*     (2006.01)
    *G01F 23/28*     (2006.01)
    *G01F 23/296*     (2006.01)

(58) Field of Classification Search
    USPC .......................................................... 342/124
    See application file for complete search history.

(56) References Cited

U.S. PATENT DOCUMENTS

| | | | |
|---|---|---|---|
| 7,334,470 B1 | 2/2008 | Bartoli | |
| 7,966,141 B2* | 6/2011 | Spanke | G01F 23/2962 702/85 |
| 8,639,457 B2* | 1/2014 | Hammer | G01F 23/284 342/124 |
| 8,776,594 B2 | 7/2014 | Welle | |
| 2005/0052314 A1* | 3/2005 | Spanke | G01F 23/284 342/124 |
| 2005/0134501 A1* | 6/2005 | Spanke | G01F 23/2962 342/124 |
| 2009/0013778 A1* | 1/2009 | Schroth | G01F 23/284 73/290 V |
| 2009/0235736 A1* | 9/2009 | Spanke | G01F 23/2962 73/290 V |
| 2010/0162811 A1* | 7/2010 | Malinovskiy | G01F 23/2962 73/290 V |
| 2010/0182190 A1* | 7/2010 | Spanke | G01F 23/284 342/124 |
| 2010/0223019 A1* | 9/2010 | Griessbaum | G01F 23/2962 702/75 |
| 2011/0166805 A1* | 7/2011 | Hammer | G01F 23/284 702/55 |
| 2012/0130509 A1 | 5/2012 | Altendorf | |
| 2012/0265486 A1* | 10/2012 | Klofer | G01F 23/0061 702/166 |
| 2013/0207836 A1* | 8/2013 | Schmitt | G01F 23/284 342/124 |

FOREIGN PATENT DOCUMENTS

| | | |
|---|---|---|
| DE | 102009055262 A1 | 6/2011 |
| DE | 102010044182 A1 | 6/2012 |
| EP | 1662237 A2 | 5/2006 |
| EP | 2418465 A1 | 2/2012 |

OTHER PUBLICATIONS

International Search Report, EPO, The Netherlands, Sep. 24, 2013.
English Translation of the International Preliminary Report on Patentability, WIPO, Geneva, Feb. 12, 2015.

* cited by examiner

METHOD FOR DETERMINING AND/OR MONITORING FILL LEVEL OF A MEDIUM IN A CONTAINER

TECHNICAL FIELD

The present invention relates to a method for determining and/or monitoring fill level of a medium in a container using a measuring device, which works according to the travel time measuring method.

BACKGROUND DISCUSSION

Measuring devices are frequently applied in automation and process control technology, in order to ascertain a process variable, such as e.g. flow, fill level, pressure and temperature or some other physical and/or chemical process variable in a running process.

The travel-time method applied in fill-level measuring devices utilizes the physical law, according to which the travel distance equals the product of travel time and propagation velocity. In such case, the fill level measurement corresponds to the travel distance of twice the separation between a reference point of the transmitter and the surface of the fill substance. The wanted echo signal, thus the signal reflected on the surface of the fill substance, and its travel time are determined preferably based on the so-called echo curve, which shows in analog or digital form the amplitudes of the echo signals as a function of separation from the transmitter. The fill level value results then from the difference between the known separation of the reference point of the transmitter from the floor of the container and the separation of the surface of the fill substance from the reference point of the transmitter determined by the measuring.

All known methods can be applied, which enable determining relatively short distances by means of reflected measurement signals. If the measurement signals are microwaves, then both pulse radar as well as also frequency modulation continuous wave radar (FMCW radar) can be used. In the following, only the pulse travel time method will be discussed. However, the method of the invention is applicable likewise to other travel time measuring methods, such as e.g. FMCW. Microwave measuring devices, in the case of which pulsed measurement signals are freely radiated, are sold by Endress+Hauser, for example, under the mark 'MICROPILOT'. Microwave measuring devices, which guide measurement signals along a conductive element into and from the container, are sold by Endress+Hauser under the mark 'LEVELFLEX'. A device type, which works with ultrasonic signals, is sold by Endress+Hauser, for example, under the mark 'PROSONIC'.

The transmitted measurement signals form with the received, wanted-echo signals a total measurement signal, which, in given cases, under actual measuring conditions, includes additional disturbance-echo signals. These disturbance echo signals have different causes, such as e.g.:
  reflections on installed objects in the container and on the container itself
  multipath propagation (retro reflection) and multimode propagation
  dispersion of transmitted waves
  foam and accretion formation by the medium filling and emptying procedures
  reflection characteristics of the medium
  noise
  low dielectric constant of the medium
  humidity in the container
  unsteady medium surfaces.

In the current state of the art, there are different approaches for removing these disturbance echo signals from the total measurement signal. Disturbance echo signals can complicate the evaluation and determining of fill level, when, for example, they cover the wanted echo signal.

Described in published international application, WO 03/016835 A1 is a method for evaluating measurement signals of a measuring device working according to the travel time principle, in the case of which a currently recorded measurement curve is compared with reference signal data. In comparing the reference signal data with the currently recorded measurement curve, there can be ascertained from time shifting of corresponding disturbance and wanted signals a correction factor, with which the sought fill level can be ascertained in the face of no present or evaluatable, wanted signal of the fill level.

The method and apparatuses disclosed in the above application for elimination of disturbance signals from the measurement signal all have the problem that they cannot react to changes of process conditions in the container, which influence the measurement signal, or to changes of the measuring method and measuring performance of the measuring device.

Described in German Patent, DE 10 2007 042 042 A1 is a method for ascertaining and monitoring fill level of a medium in a container by a field device, wherein the fill level is ascertained in the envelope curve from transmission signals and reflection signals based on travel times, respectively travel distances. The disturbance echo signals are stored in a masking curve, which is ascertained in a first measuring cycle from the envelope curve of the measurement signals in the empty container, and, for evaluating the envelope curve, an evaluation curve is stored, which is ascertained in a first measuring cycle from the envelope curve. In order to reduce the need for memory and so that the curves can be adapted to the measuring situation, the masking curve and/or evaluation curve are editable, in that the curve functions are formed from a reduced number of support points with appropriate, connectable functions.

Described in published German patent application DE 10 2005 003 152 A1 is a method for reviewing the orderly functioning of a fill-level measuring device, which works according to the travel time principle. For this, in predetermined or selectable time intervals, a measured value curve is ascertained at a current fill level; based on the current measured value curve, the wanted echo signal is determined. Then, the expectation value for the quality of the wanted echo signal is determined at at least one predetermined fill level based on the signal amplitude of the current wanted echo signal and based on an ideal echo curve ascertained under predetermined process and/or system dependent conditions. The ascertained expectation value for the quality of the wanted echo signal at the predetermined fill level is compared with a predetermined critical value for the quality, and an error state is diagnosed, when the ascertained expectation value subceeds the critical value for the quality.

An object of the invention is to provide an improved and more accurate method for evaluating measurement signals of fill-level measuring devices.

SUMMARY OF THE INVENTION

The object is achieved according to the invention by a method for determining and/or monitoring fill level of a medium in a container with a measuring device, which works according to the travel time measuring method, wherein measurement signals are transmitted toward the medium and reflected on a surface of the medium as wanted echo signals or on a surface of a disturbing element as disturbance echo signals and are received, wherein from the high-frequency total measurement signal, composed by superimposing the transmitted measurement signals, the reflected wanted echo signals and the disturbance echo signals, by a sequential sampling, a low-frequency intermediate frequency signal is produced, wherein from the intermediate frequency signal at least one raw echo curve or digitized envelope curve dependent on the travel time or the travel distance is ascertained, wherein the wanted echo signals and/or the disturbance echo signals in the raw echo curve or the digitized envelope curve are ascertained based on an ideal echo curve, which shows the amplitude of the echo signals of an ideal reflector as a function of the distance from the ideal reflector, and wherein based on the ascertained wanted echo signal the fill level is determined.

Using this method, an option is given to react to modifications of process conditions and modifications of the metrological condition of the measuring device and thereby to optimize the ascertaining and measuring of the fill level of a medium in the container. For this, a procedure as follows is applied: From a measuring device, a measurement signal is transmitted via a transmitting and receiving unit and reflected on the surface of the medium as wanted echo signal and, for example, on the disturbing elements as disturbance echo signals. The total measurement signal arises from a superimposing of the transmitted measurement signal, the wanted echo signal and, in given cases, disturbance echo signals. The low frequency intermediate frequency signal is produced from the total measurement signal by means of a signal sampling circuit. Fundamentally in the case of this sequential sampling method, a measurement signal is produced and transmitted, and a sampling signal produced using a somewhat smaller pulse repetition frequency or the sampling signal is produced phase modulated relative to the emitted measurement signal. The lower frequency, intermediate frequency signal is produced by feeding the total measurement signal and the sampling frequency signal to a frequency mixer. The lower frequency, intermediate frequency signal has the same curve as the total measurement signal, but is, however, stretched relative to the total measurement signal by a time expansion factor, which equals the quotient of the pulse repetition frequency of the measurement signal and the frequency difference of the two frequencies of sampling signal and the measurement signal. In the case of a pulse repetition frequency of some megahertz, a frequency difference of few hertz and a microwave frequency of some gigahertz, a frequency of the intermediate signal of less than 100 kHz is produced.

The transformation of the total measurement signal to the intermediate frequency has the advantage that relatively slower and, thus, cost effective, electronic components can be used for signal evaluation. For an analog further processing, an analog raw echo curve is produced, which corresponds to the analog intermediate frequency signal obtained by an averaging over a number of total measurement signals. If subsequent method steps are performed with digital values, there is ascertained from the analog intermediate frequency signal by a rectification, optionally a taking of the logarithm of and a digitizing of the analog intermediate frequency, a digitized envelope curve, respectively envelope. An evaluation curve is ascertained by a smoothing procedure from the raw echo curve or digitized envelope curve. The evaluation curve is produced by a smoothing procedure, which always represents a mathematical filter function of the digitized envelope curve, respectively the raw echo curve. For example, the smoothing is effected by using a filter function with a window function, e.g. a sliding average with a certain window width. These smoothing procedures have, however, most often, the disadvantage that the curve form is strongly changed and the signal breadth of the echo signals is broadened, since the averaging width must often be very broadly set, in order that no artefacts are obtained. The evaluation curve masks especially well disturbance echo signals, which are statistical in nature and arise, for example, from the filling of the tank, by stirring the medium and as a result of an unsteady surface of the medium. If the measuring situation changes in the container, respectively process region or, for example, the filter parameters of the measuring device are modified, then the evaluation curve must be adapted to the changed conditions. Since these changes, respectively modifications of the process and metrological conditions, have an influence on the total measurement signal and correspondingly on the envelope curve, in that, for example, the position or the shape of the envelope curve and the wanted echo signals, respectively disturbance echo signals, changes, these influences must also be taken into consideration in the static reference curve.

An advantageous embodiment of the method of the invention provides that the ideal echo curve is calculated and ascertained by means of a predetermined algorithm.

A very advantageous variant of the method of the invention is that in which the ideal echo curve is ascertained by means of a comparison measurement with an ideal reflector and stored.

Another supplementing variant of the method of the invention provides that the ideal echo curve is fitted by means of an algorithm and an adaptive ideal echo curve is produced.

An especially advantageous further development of the method of the invention provides that the adaptive ideal echo curve is shifted by the algorithm based on an offset-shifting along a logarithmic amplitude axis.

A preferred form of embodiment of the method of the invention provides that the shifting of the adaptive ideal echo curve is performed based on the algorithm based on the amplitude of the greatest echo.

An advantageous example of an embodiment of the method of the invention provides that the shifting of the adaptive ideal echo curve is performed based on the algorithm based on a noise level.

An advantageous alternative example of an embodiment of the method of the invention provides that the shifting of the adaptive ideal echo curve is performed based on the algorithm based on setting parameters of the measuring device.

An especially advantageous further development of the method of the invention provides that the adaptive ideal echo curve is adapted to changed measuring conditions, e.g. in the form of signal attenuation changes, by means of a shape adapting based on the algorithm.

In an additional advantageous embodiment of the method of the invention, it is provided that the shape adapting of the adaptive ideal echo curve is performed by the algorithm by means of a monitoring of the amplitude of the wanted echo signal at different distances, respectively travel times.

Another supplementing variant of the method of the invention provides that the shape adapting of the adaptive ideal echo curve is performed based on the algorithm based on setting parameters of the measuring device.

A preferred form of embodiment of the method of the invention provides that for diagnosis of the measuring device or the measuring point and for obtaining further supplemental information concerning the application, the ideal echo curve is compared with the adaptive ideal echo curve based on the algorithm.

An advantageous example of an embodiment of the method of the invention provides that for diagnosis of the measuring device or the measuring point and for obtaining further supplemental information concerning the application, the ideal echo curve or the adaptive ideal echo curve is compared with the noise level based on the algorithm

BRIEF DESCRIPTION OF THE DRAWINGS

The invention will now be explained in greater detail based on the appended drawing. For simplification, identical parts in the drawing are provided with equal reference characters. The figures of the drawing show as follows.

DETAILED DISCUSSION IN CONJUNCTION WITH THE DRAWINGS

Figure 1:
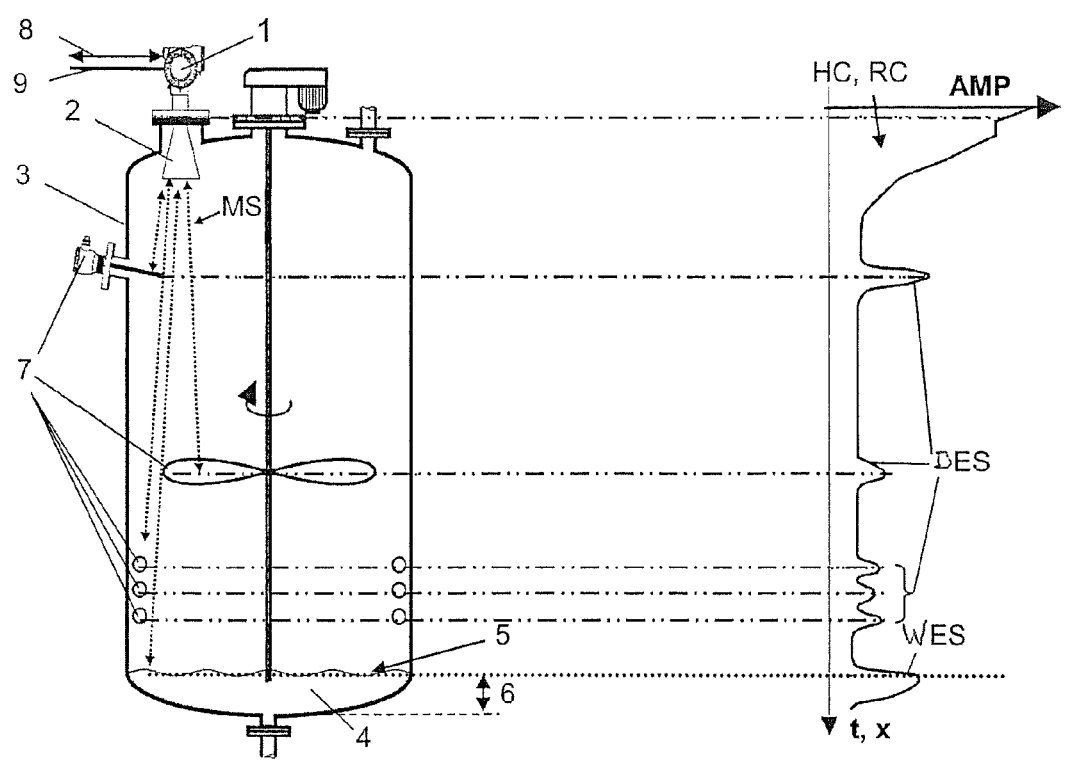
FIG. 1 is an example of an embodiment of a measurement setup of the measuring device on a container with some of the possible disturbing influences as well as the corresponding digitized envelope curve, respectively raw echo curve.

FIG. 1 shows mounted on a container 3 in a nozzle 12 a measuring device 1, which ascertains according to the travel time measuring method the fill level 6 of a medium 4 in the container 3. Shown as disturbing elements 7 in the drawing are, for example, a stirrer, a cooling tube system and another measuring device installed in the container wall. Other disturbing elements 7 not explicitly shown in the drawing can also influence the measuring. An envelope curve ENC corresponding to the measuring situation in the container 3 is shown proportionally to the height of the container 3. The shown envelope curve ENC plots the amplitude AMP of the sampled, transmitted and reflected measurement signal MS as a function of the travel distance x, respectively the travel time t. The disturbing influences of disturbing elements 7 in the container 3 and the surface 5 of the medium 4 are associated via reference lines directly with the corresponding wanted echo signal WES and the corresponding disturbance echo signals DES in the envelope curve ENC, so that one can see cause and effect. The transmitting and receiving unit 2 is embodied as a horn antenna. However, any known transmitting and receiving unit 2, whose measuring device 1 works according to the travel time measuring method, such as e.g. planar antennas, rod antennas, parabolic mirror antennas, microwave guide, sound transducers, as well as optical transmitting and receiving elements, can be used. For communication with remote measuring devices 1 or a control station, a fieldbus 8 is provided, which works according to a usual communication standard, such as e.g. Foundation Fieldbus, Profibus PA, and is embodied, for example, with two conductor technology. The supplying of the measuring device 1 with energy can occur, supplementally to the energy supply of the measuring device 1 via the fieldbus 8, by means of a separate supply line 9.

Figure 2:
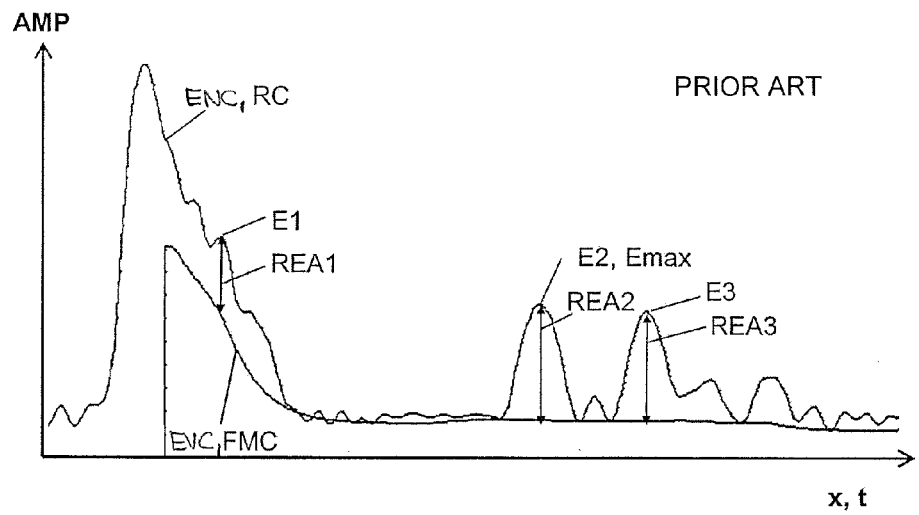
FIG. 2 is a graph showing a smoothed evaluation curve, which was produced by a sliding minimum value formation.

FIG. 2 shows a graph according to the state of the art with a smoothed evaluation curve EVC, which was produced, for example, by means of a filtering method, which produces from the envelope curve ENC, respectively the raw echo curve RC, a filter minimum curve FMC via a sliding minimum value formation method. The evaluation curve EVC gives the reference point for ascertaining the amplitudes Amp of wanted echo signals WES and disturbance echo signals DES, whereby a correct measure is specified, in order that the echos can be compared with one another in the case of different distances x, respectively travel times t. The relative amplitudes Amp of the echos WES, DES, E are calculated with reference to the evaluation curve and compared with one another. In the simplest case, the maximum echo Emax with the greatest relative amplitude REA is ascertained and set equal to the reflection of the measurement signal MS on the surface 5 of the fill substance 4, respectively the fill level 6. In this evaluation, not only the ascertaining of the absolute amplitudes Amp of the echos WES, DES, E, but, instead, also the shape of the evaluation curve EVC plays a deciding role.

Figure 3:
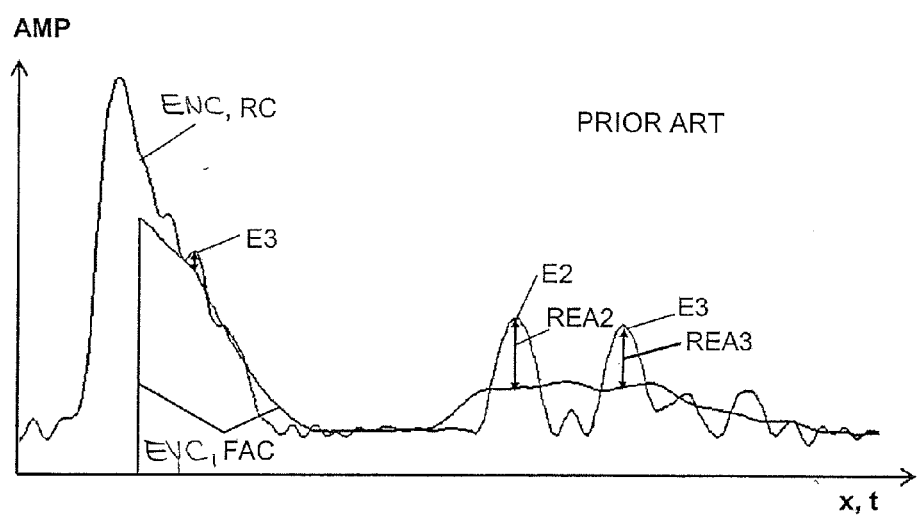
FIG. 3 is a graph with a smoothed evaluation curve, which was produced by a sliding average formation.

Furthermore, there is shown in FIG. 3 a graph according to the state of the art with a smoothed evaluation curve EVC, which was produced, for example, by means of a filtering method, which produces from the envelope curve ENC, respectively the raw echo curve RC, a filter average curve FAC by means of sliding average formation. For example, the smoothing is produced by using a mathematical filter function with a window function, e.g. a sliding average with a certain window width. For this, beginning at a position in the envelope curve ENC, within a certain window width, all measured values are ascertained and an average value calculated therefrom. This ascertained average value of the measured values within the window is stored in reference to the measuring point, respectively travel time t and at the additional measurement points, respectively discrete travel times t, in the digitized envelope curve ENC, this average formation is performed. From the stored average values in reference to the measurement points, respectively travel times, then a sliding average value, evaluation curve FAC is ascertained.

The smoothed evaluation curve FMC of FIG. 2, which was produced by a sliding minimum value formation and the graph with a smoothed evaluation curve FAC of FIG. 3, which was produced by a sliding average formation, are abstract mathematical curves, which take into consideration no physical laws such as attenuation of the measurement signal MS along the traveled path x. The echos WES, DES with the greatest relative amplitude REA with reference to these smoothed evaluation curves FMC, FAC does not absolutely correspond to the strongest reflection of the measurement signal MS. In some situations, the ascertaining of the wanted echo signal WES can be in error. Especially critical is the comparison with the first echo E1 in the decay region of the transmission pulse and with disturbance echo signals DES. For example, in FIGS. 2 and 3, the second echo E2 would be selected as wanted echo signal WES of the fill level 6 of the fill substance 4, although the first echo E1 has a stronger reflection.

Figure 4:
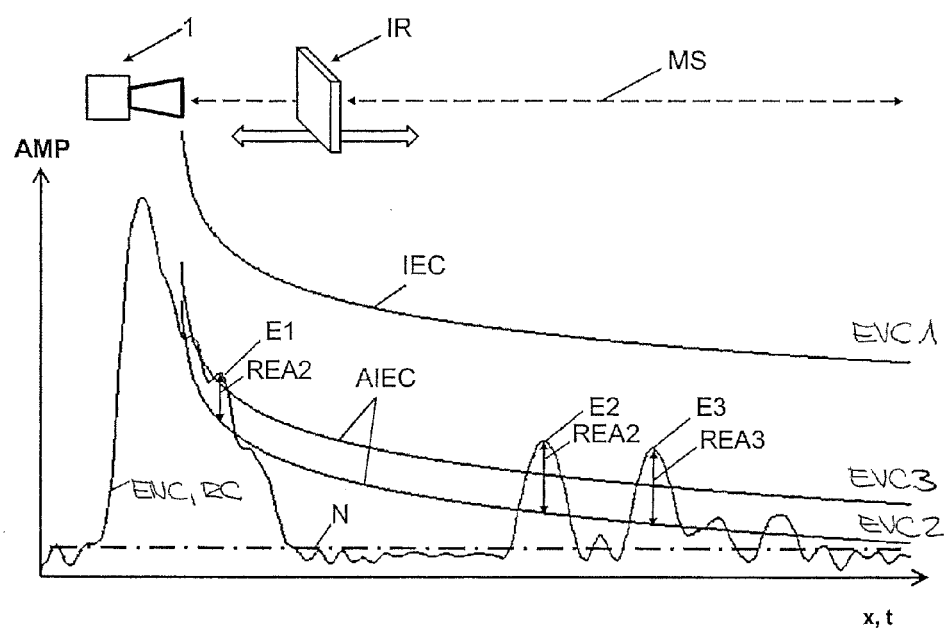
FIG. 4 is a graph with an ideal echo curve as evaluation curve.
Figure 5:
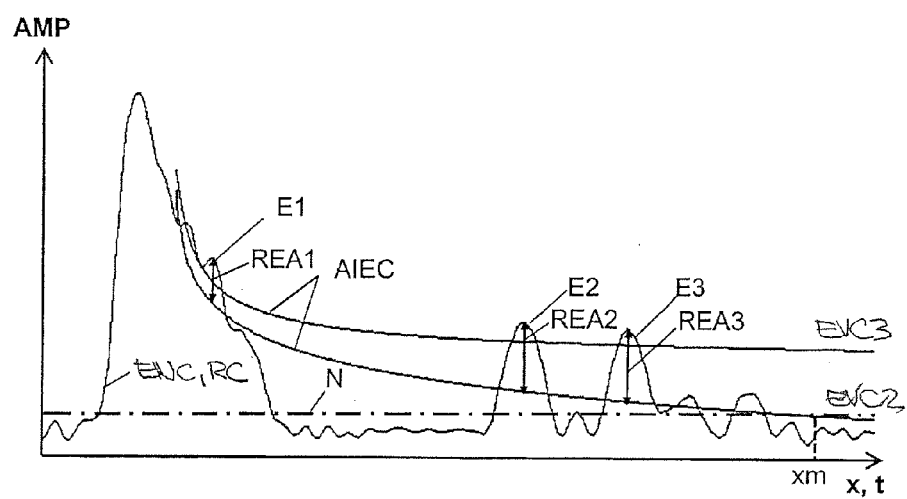
FIG. 5 is a graph with amplitude shifting of the ideal echo curve as evaluation curve.

FIG. 4 shows a graph with an ideal echo curve IEC as evaluation curve, and FIG. 5 shows amplitude shifting of the ideal echo curve IEC as evaluation curve. The ideal echo curve IEC is defined as the amplitude AMP of the wanted echo WES from an ideal reflector IR, e.g. a large surfaced metal reflector, as a function of the distance, respectively traveled distance x, to and from the ideal reflector IR. Thus, the ideal echo curve IEC is a physical curve, which takes into consideration the dependence of the amplitude AMP of the wanted echo signals WES and disturbance echo signals DES on the travel time t, respectively the traveled distance x, of the measurement signals MS, and forms a basis for comparison of echo signals WES, DES at different distances x. This ideal echo curve IEC forms the basis for the evaluation curve EVC, EVC1 of the invention.

By a matching of the ideal echo curve IEC to the measuring conditions of the measuring device 1 in the process, additional advantages could be achieved. In the case of freely radiating fill-level measuring devices 1 of the applicant sold under the marks, Micropilot and Prosonic, the evaluation curve EVC1 fulfills, however, yet another important function by isolating the echos WES, DES from the noise level N. The noise peaks of the noise level N below the evaluation curve EVC are not evaluated as wanted echo signal WES. The sliding average value evaluation curve FAC of FIG. 3 and the sliding minimum evaluation curve FMC of FIG. 2 are fitted to this noise level N by their construction and their production.

In a first embodiment, the ideal echo curve IEC can be fitted according to the invention to the noise level as an adaptive ideal echo curve AIEC by a special algorithm. This fitting of the invention occurs by a shifting of the ideal echo curve IEC along the amplitude axis Amp in the logarithmic representation. When fitted to the noise level N, the position of the adaptive ideal echo curve AIEC corresponds to the minimum reflection factor of the fill substance 4, in the case of which the fill level 6 can still be detected in the total measuring range. A corresponding multiplication by the reflection factor in the linear representation of the amplitude AMP corresponds mathematically to an addition, respectively shifting, of the adaptive ideal echo curve AIEC in the logarithmic representation. The noise level N can be ascertained from the envelope curve ENC or a part of the envelope curve ENC, for example, the envelope curve ENC without the decay of the transmission pulse, by means of linear regression or some other method. Referenced to the adaptive ideal echo curve AIEC of the invention e.g. in FIG. 4, the third echo E3, which corresponds to the strongest reflection of the surface 5 of the fill substance 4, would have the highest relative amplitude REA3 of the third echo E3. Based on these considerations, this third echo E3 would be ascertained as wanted echo signal WES, respectively fill level echo signal.

In a supplemental or alternative embodiment, also the amplitude AMP of the wanted echo signals WES maximum relative to the ideal echo curve IEC can be used for fitting. In such case, the ideal echo curve IEC is shifted along the logarithmic amplitude axis until the adaptive ideal echo curve AIEC intersects the maximum echo Emax. Starting from this position, the adaptive ideal echo curve AIEC is shifted by an additional predetermined amplitude magnitude to produce a third evaluation curve EVC3. This fitting method corresponds to fitting the ideal echo curve IEC to the current reflection factor of the fill substance 4. This matching of the adaptive ideal echo curve AIEC to the current reflection factor of the fill substance 4 can occur, for example, in each measuring cycle of the measuring device 1 or at start-up of the measuring device 1. After such fitting, the maximum measuring range can be ascertained or checked as the distance x from the intersection of the adaptive ideal echo curve AIEC and the noise level N. If this maximum measuring range is, for example, less than a predetermined measuring range size, the measuring device 1 issues a warning or an alarm. This maximum measuring range informs concerning the maximum distance xm within with an evaluatable reflection signal of the measurement signal MS on the surface 5 of the fill substance can still be obtained.

In the examples of embodiments given here, semi-logarithmic plotting of the envelope curve ENC is used, in the case of which the amplitude AMP axis is logarithmic and the travel time t axis is linear. The representation and the fitting of the ideal echo curve IEC according to the invention could also be done based on a purely linear representing of the envelope curve ENC, wherein the shifting of the envelope curve ENC as an addition in the logarithmic representation corresponds to a scaling of the envelope curve ENC in the amplitude as a multiplication in the linear representation.

The fitting of the adaptive ideal echo curve AIEC is also determined as a function of application-specific parameters, such as e.g. the dielectric constant of the fill substance, respectively medium 4, (the dielectric constant influences the reflection factor), the state of the surface 5 of the fill substance 4 (the state of the surface 5 influences the reflection properties of the measurement signals MS on the surface 5 of the fill substance 4), and the material, respectively the geometry, of the container 3 (material and geometry influence antenna gain and signal attenuation). These application parameters are set by the user, most often, directly in the measuring device 1.

According to the invention, it is, however, also possible to have certain application parameters in the measuring device 1 be correspondingly automatically adapted by the measuring device 1 for determining the ideal echo curve IEC. If, for example, the signal attenuation in the current application is other than in preceding applications, in which the ideal echo curve IEC was determined, the shape of the ideal echo curve IEC could be correspondingly adapted. FIG. 4 shows an example of adapting the shape of the adaptive ideal echo curve AIEC. For example, in the case of installation of the measuring device 1 in a sounding tube, the attenuation of the measurement signals MS is less than in the case of a free-field transmission of measurement signals, in the case of presence of a gas phase due to steam, or in the case of forming fill substance accretion on the measuring probe of a time-domain reflectometer. This shape-adapting of the adaptive ideal echo curve AIEC can be effected by means of an adjusting the application parameters in the measuring device by the user or automatically by the measuring device by monitoring the amplitude AMP of the fill-level echo at different distances.

Further integrated in the measuring device 1 is an algorithm, which performs a comparison of the offset of the amplitude AMP and the formation of the adapted ideal echo curve AIEC with the original ideal echo curve IEC and wins from this comparison useful information for diagnostics of the measuring point and/or supplemental information concerning the application. By this comparison of the original ideal echo curve IEC with the adaptive ideal echo curve AIEC, accretion on the antenna or the measuring probe can be detected or the state of the surface 5 of the fill substance 5 evaluated.

In an additional case of application, when the decay of the excitation pulse of the measurement signal MS is superimposed on the fill-level echo, a special echo evaluation can be performed. The height of the amplitude AMP of the wanted echo signal WES of the fill level 6 is in the decay region, respectively ringing region, due to superimposing with the decay signal much greater than the wanted echo signal WES caused purely by the reflection on the surface 5 of the fill substance 4. In the linear representation, the ideal echo curve IEC in the vicinity of the ringing, respectively decay, can be adapted. In this representation, without taking into consideration the interference effects, an additive superimposing of the device and installation specific echo, which form the ringing, and the fill-level echo can be assumed. Then by a local increasing of the ideal echo curve IEC by the magnitude the amplitudes Amp of the device and installation specific echos, the wanted echo signal WES of the fill level 6 can be separated from the decay of the transmission pulse, respectively the additive superimposing of the device and installation specific echos. By difference forming in calculating the relative echo amplitudes REAL of the first echo E1, the ringing magnitudes are subtracted.

The invention claimed is:

1. A method for determining and/or monitoring fill level of a medium in a container with a measuring device, which works according to the travel time measuring method, comprising the steps of:
   transmitting measurement signals toward the medium and reflected on a surface of the medium as wanted echo signals or on a surface of a disturbing element as disturbance echo signals and are received,
   from the high-frequency total measurement signal, composed by superimposing the transmitted measurement signals, the reflected wanted echo signals and the disturbance echo signals, by a sequential sampling, a low-frequency, intermediate frequency signal is produced,
   from the intermediate frequency signal at least one raw echo curve or digitized envelope curve dependent on travel time or travel distance is ascertained;
   ascertaining the wanted echo signals and/or the disturbance echo signals in the raw echo curve or the digitized envelope curve based on an ideal echo curve, which shows the amplitude of the echo signals of an ideal reflector as a function of the distance from the ideal reflector; and
   based on the ascertained wanted echo signal the fill level is determined.

2. The method as claimed in claim 1, wherein:
the ideal echo curve is calculated and ascertained by means of a predetermined algorithm.

3. The method as claimed in claim 1, wherein:
the ideal echo curve is ascertained by means of a comparison measurement with an ideal reflector and stored.

4. The method as claimed in claim 2, wherein:
the ideal echo curve is fitted by means of an algorithm and an adaptive ideal echo curve is produced.

5. The method as claimed in claim 4, wherein:
said adaptive ideal echo curve is shifted by the algorithm based on an offset-shifting along a logarithmic amplitude axis.

6. The method as claimed in claim 5, wherein:
the shifting of said adaptive ideal echo curve is performed based on the algorithm based on the amplitude of the greatest echo.

7. The method as claimed in claim 5, wherein:
the shifting of said adaptive ideal echo curve is performed based on the algorithm based on a noise level.

8. The method as claimed in claim 5, wherein:
the shifting of said adaptive ideal echo curve is performed based on the algorithm based on setting parameters of the measuring device (1).

9. The method as claimed in claim 1, wherein:
said adaptive ideal echo curve is adapted to changed measuring conditions, e.g. in the form of signal attenuation changes, by means of a shape adapting based on the algorithm.

10. The method as claimed in claim 9, wherein:
the shape adapting of said adaptive ideal echo curve is performed by the algorithm by means of a monitoring of the amplitude of said wanted echo signal at different distances, respectively travel times.

11. The method as claimed in claim 9, wherein:
the shape adapting of said adaptive ideal echo curve is performed based on the algorithm based on setting parameters of the measuring device (1).

12. The method as claimed in claim 1, wherein:
for diagnosis of the measuring device or the measuring point and for obtaining further supplemental information concerning the application, said ideal echo curve is compared with said adaptive ideal echo curve based on the algorithm.

13. The method as claimed in claim 1, wherein:
for diagnosis of the measuring device or the measuring point and for obtaining further supplemental information concerning the application, said ideal echo curve or the adaptive ideal echo curve is compared with the noise level based on the algorithm.

* * * * *